Inventor
Nobutoshi Kihara by Hill, Sherman, Meroni, Gross & Simpson Attys.

Nov. 26, 1963 NOBUTOSHI KIHARA 3,112,365

SIGNAL AMPLIFYING DEVICE

Filed Oct. 5, 1960 2 Sheets-Sheet 2

Inventor
Nobutoshi Kihara by Hill, Sherman, Meroni, Gross & Simpson Attys

United States Patent Office 3,112,365

Patented Nov. 26, 1963

3,112,365

SIGNAL AMPLIFYING DEVICE

Nobutoshi Kihara, Tokyo, Japan, assignor to Sony Corporation, Shinagawa-ku, Tokyo, Japan, a corporation of Japan Filed Oct. 5, 1960, Ser. No. 60,649
Claims priority, application Japan Oct. 8, 1959
1 Claim. (Cl. 179—1)

This invention relates to a signal amplifying device, and more particularly to a transistor amplifying device using transistors to obtain efficient amplification.

It is a principal object of this invention to provide a signal amplifying device which enables one to obtain most efficient signal output amplification by using transistors.

It is another object of this invention to provide a signal amplifying device in which transistors of the device will exhibit an efficiency equivalent to the maximum dissipation efficiency thereof.

A further object of this invention is to provide a signal amplifier which is able to keep a minimum power consumption at no signal period and to amplify the signal efficiently during the duration of the signal.

For a further comprehension of the invention, and of the objects and advantages thereof, reference will be made to the following description taken in connection with the accompanying drawings in which, FIG. 1 is a circuit diagram, by way of example, of this invention.

FIG. 2, I, II, III and IV show explanatory diagrams of the pulse width modulation according to this invention.

Figure 1:
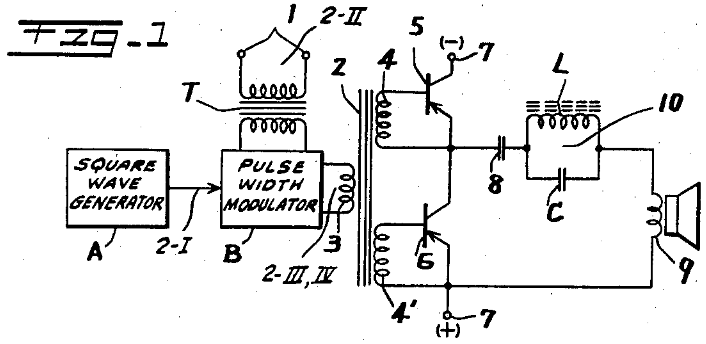

Explanation of an example in accordance with this invention is taken in connection with the drawing. In FIG. 1, A is any desired square wave form voltage generating device having a constant repetition frequency of 30 kc. for instance. B is a pulse width modulator in which the square wave voltage is modulated in width by a voice frequency voltage which is impressed from terminals 1 through a transformer T.

In accordance with this invention, the output side of the pulse width modulator B is connected to the primary side 3 of a transformer 2, the two secondary sides 4 and 4' of which are connected respectively to the respective base and emitter of two transistors 5 and 6 connected in a push-pull arrangement. Output side collectors and emitters of the transistors are in series connection with respect to the power source 7. Apart from the power circuit, a speaker 9 is inserted between the emitter of one transistor 5 and the emitter of the other transistor 6 or (+) side of the power source through a direct current blocking capacitor 8.

Moreover, in accordance with this invention, an electrical circuit 10 which is composed of an inductance coil L and a capacitor C parallel therewith and which has sufficiently high impedance for relatively high frequencies such as 30 kc. is connected in series with the speaker 9. That is, this circuit will be a filter circuit or a resonance circuit in which higher frequencies will be blocked but lower frequencies such as voice frequencies will be allowed to pass.

Figures 2, 3:
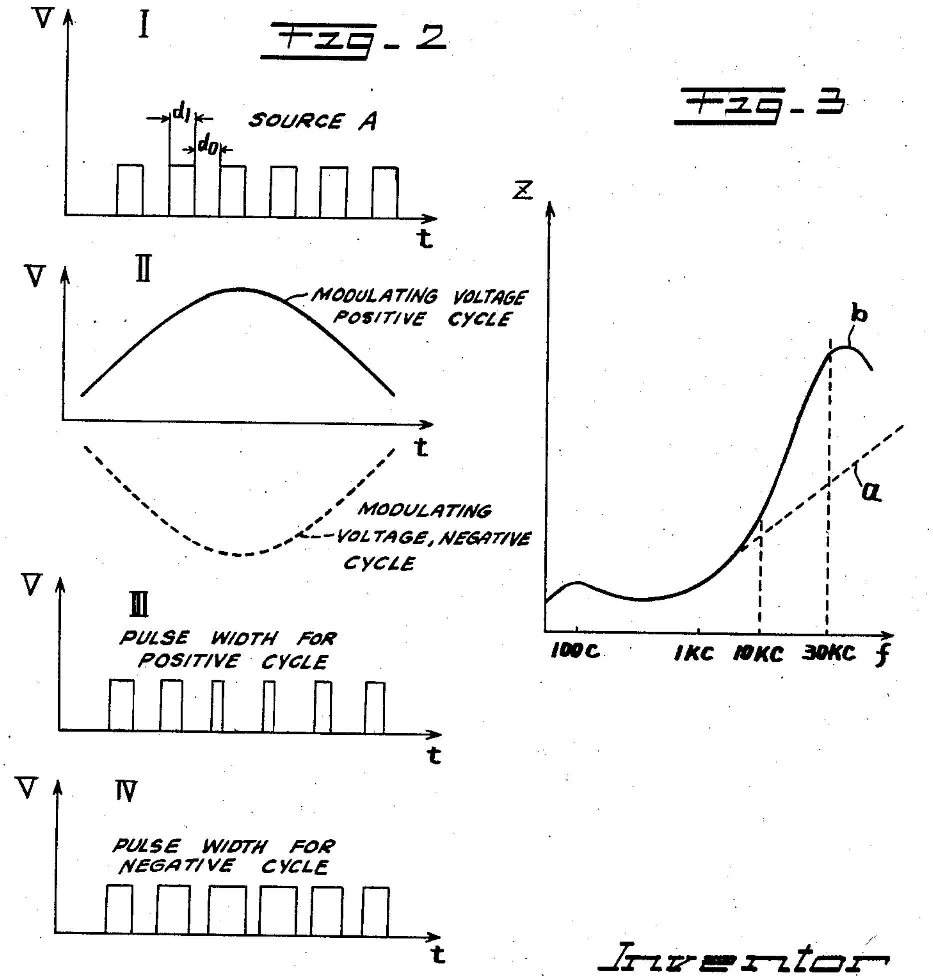
FIG. 3 is a load impedance characteristic curve of the device shown in FIG. 1, plotting impedance against frequency.

The operation of the aforementioned transistor amplifying device according to this invention is as follows:

Now, the impedance characteristics Z of a speaker 9 as a function of the frequency $f$ can generally be shown by a curve "$a$" in FIG. 3. It will be seen from the curve that the impedance is still low in the voice frequency range below 10 kc. but the entire circuit has several times higher impedance value in higher frequencies such as 20 kc. or 30 kc. as shown by the curve $b$.

Next, explanation will be taken in connection with the pulse width modulation made by the circuits A and B. The square waveform voltage generating device A produces a pulse carrier wave having the ratio of the width $d_1$ of the pulse to the space $d_0$ is unity or $d_1{:}d_0=1{:}1$ as shown by the curve in FIG. 2, I.

When a positive low frequency voice signal as shown in FIG. 2, II, is impressed into the width modulator B, the square waveform pulse $d_1$ is so modulated that the width is varied and becomes less according to the height or amplitude of the voice signal shown by the curve in FIG. 2, III.

When a minus low frequency voice signal shown by the dotted line of FIG. 2, II is impressed into the width modulator B, on the contrary, the square waveform pulse $d_1$ is so modulated that the width is varied and becomes larger according to the height of the signal as shown by the curve in FIG. 2, IV.

Thus the width modulated pulses are impressed into the input side of the transistor circuit shown in FIG. 1. The repetition pulses as shown in FIG. 2, I will come into the transistor circuit at no signal duration and the frequency thereof is so high, as for example, 30 kc. that the impedance of the speaker 9 for this high frequency is large as shown by the curve $a$ in FIG. 3. The resultant impedance of the output circuit having the L-C circuit 10 becomes amply large as shown by the curve $b$ so that the current having such a high frequency can scarcely pass through the speaker.

During the signal interval, however, the width modulated pulses as shown by the curves in FIG. 2, III and IV, are impressed into the input side of the transistor circuit in response to the low frequency signals.

The output voltage of the circuit will vary as the low frequency voltage variation in accordance with the voice signals. As the low frequency or the voice signal lies almost entirely below 10 kc., the impedance of the speaker 9 and the L-C circuit 10 is so low at these frequencies that the input voltage or current of the speaker varies in proportion to the input signals which can efficiently pass through the speaker 9.

As stated above according to this invention, a repetition pulse carrier having a constant frequency is modulated in width by a voice voltage and the width modulated pulse is so impressed to the transistor circuit that it effects a switching operation. Accordingly, the operating efficiency is superior and an amplifying device according to this invention will exhibit a maximum dissipation efficiency.

Moreover, the pulse of a constant repetition frequency, at no signal duration, will be choked by the resultant large impedance of the output side of the amplifier and will hardly pass through the amplifier.

Accordingly, the amplifying device according to this invention has an advantage that a required low frequency output only will be picked up and amplified efficiently without giving an appreciable power consumption.

Figure 4:
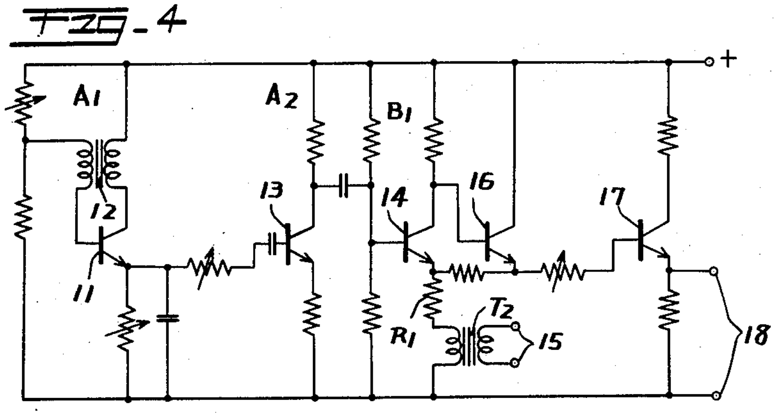
FIG. 4 is a circuit diagram of a pulse width modulation circuit which may be employed in this invention.

FIG. 4 shows another embodiment of this invention. $A_1$ is a saw tooth waveform voltage generator having a constant frequency such, for example, as 20 kc.

The generator $A_1$ is composed of a transistor 11 and a back coupling circuit 12 connected between the base and collector of the transistor. $A_2$ is an amplifier for amplifying the output of the generator and includes a transistor 13. $B_1$ is a pulse width modulator which has a transistor 14 to the base of which the amplified saw tooth wave form voltage is impressed and to the emitter of which an input voltage, for example a voice signal voltage is impressed from the terminals 15 through a transformer $T_2$. The transistor circuit includes a clipping circuit which gives an adequate bias voltage to the emitter through a resistor $R_1$.

The saw tooth waveform voltage and the signal voltage are superimposed and clipped in the transistor 14. Thus the pulses which are modulated in width according to the amplitude of the input voice signal voltage or the width modulated pulse can be produced from the output side of the clipping circuit.

The clipped width-modulated pulses are amplified by transistors 16 and 17 and led to the output terminals 18 of the last transistor 17.

It is apparent, of course, that such a width modulated pulse output can be obtained by any other desired apparatus.

Figure 5:
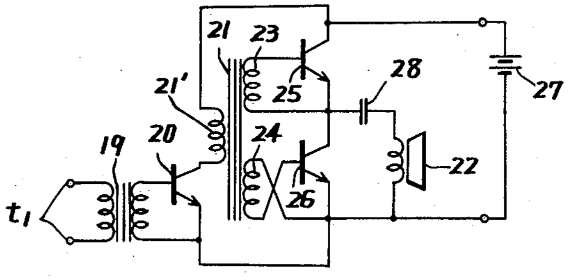
FIG. 5 is a circuit diagram showing another example of signal amplifying device according to this invention.

FIG. 5 shows an amplifier circuit for amplifying the width modulated pulse output thus obtained and for supplying the same to a speaker 22.

That is, the width modulated pulse output is impressed to terminals $t_1$ and led, through a transformer 19, to a transistor 20 the collector of which is connected to the primary side 21' of a transformer 21. The secondary sides 23 and 24 of the transformer 21 are respectively connected to the bases of transistors 25 and 26 to form a push-pull connection.

The collectors and emitters of the transistors 25 and 26 are connected in series or cascade with respect to a D.C. source 27. A speaker 22 is inserted between the emitters of the transistors through a blocking capacitor 28. Thus the connection system of this invention is that the input side forms a push-pull connection and the output side forms a series connection. Accordingly this connection system is called "a series push-pull connection of the transistors" in this invention.

Figure 6:
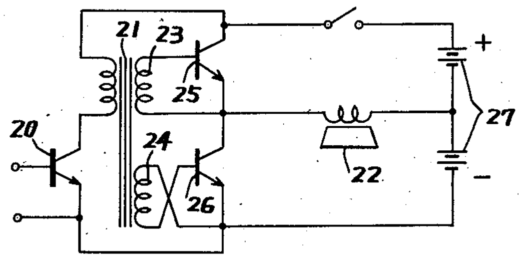
FIG. 6 is also a circuit diagram showing a further example of this invention.

FIG. 6 shows another embodiment of this invention in which the speaker 22 is inserted between the mid-point of a D.C. source 27 and the emitter of a transistor 25. It will be apparent that the connection of this example is also a series push-pull connection as shown in FIG. 5.

The operations of the devices shown in FIGS. 5 and 6 are substantially the same as has already been explained in connection with the device shown in FIG. 1.

Namely, at no signal duration, the repetition pulse output as shown in FIG. 2, I is impressed into the transistors, but the frequency of the repetition pulses is so high, such as 20 kc., that the impedance of the speaker is maintained large for such high frequency, which prevents appreciable current from flowing through the speaker.

At signal duration, however, width modulated pulse output as shown in FIG. 2, II, III and IV is impressed into the transistors according to the low frequency input and the voltage applied to the capacitor 28 varies with the voice voltage variation. The frequency of the voice voltage is almost entirely below 10 kc., at which the impedance of the speaker is low. Accordingly, the input voltage to the speaker varies in proportion to the input signal voltage variation, and the low frequency voice current can effectively flow through the speaker.

It will be appreciated in this case that a direct current does not pass through the output side of the transistor circuit, because the transistors 25 and 26 are connected in the series and push-pull type to form a balanced circuit as has already been referred to. Accordingly the power loss due to the direct current can be minimized.

It will be understood that many modifications and variations may be effected without departing from the scope of the novel concepts of this invention.

What is claimed is:

A signal amplifying device comprising means for generating non-sinusoidal carrier pulses at a constant repetition frequency, a signal source, a modulator connected across the outputs of said signal source and the carrier pulse generator and modulating the duration of said carrier pulses in response to variations in said signal source, said modulator comprising means for reducing the duration of said pulses only when the signal has one polarity and increasing the duration of said pulses only when the signal is of opposite polarity, and an electromagnetic transducer actuated by said modulated pulses, said transducer including an impedance means presenting a high impedance to the repetition frequency of the unmodulated carrier pulses.

References Cited in the file of this patent

UNITED STATES PATENTS 2,535,061 Grieg ---------------- Dec. 26, 1950
2,990,516 Johannessen ---------- June 27, 1961

FOREIGN PATENTS 543,931 Italy ---------------- Mar. 28, 1956